July 15, 1969    J. DIMEFF    3,455,171
INERTIAL REFERENCE APPARATUS
Filed March 22, 1966    2 Sheets-Sheet 1
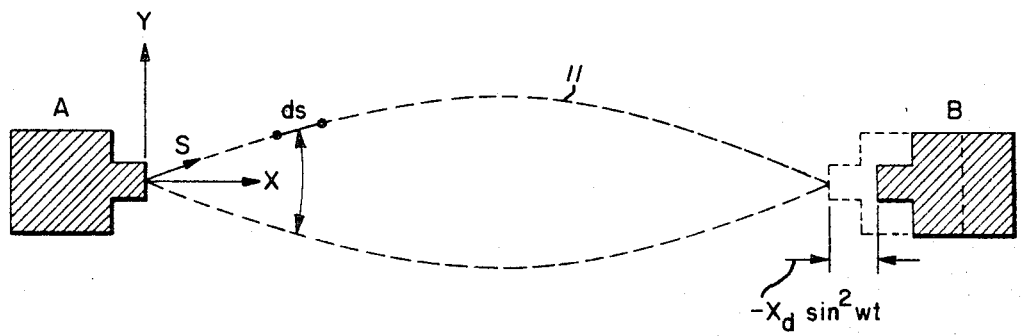
Fig_1
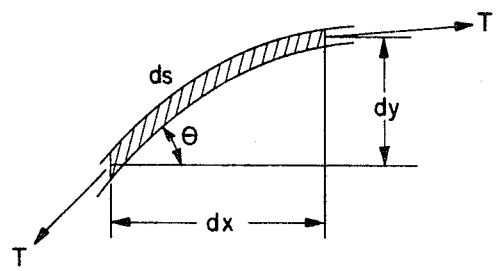
Fig_2
INVENTOR
JOHN DIMEFF
BY
ATTORNEYS

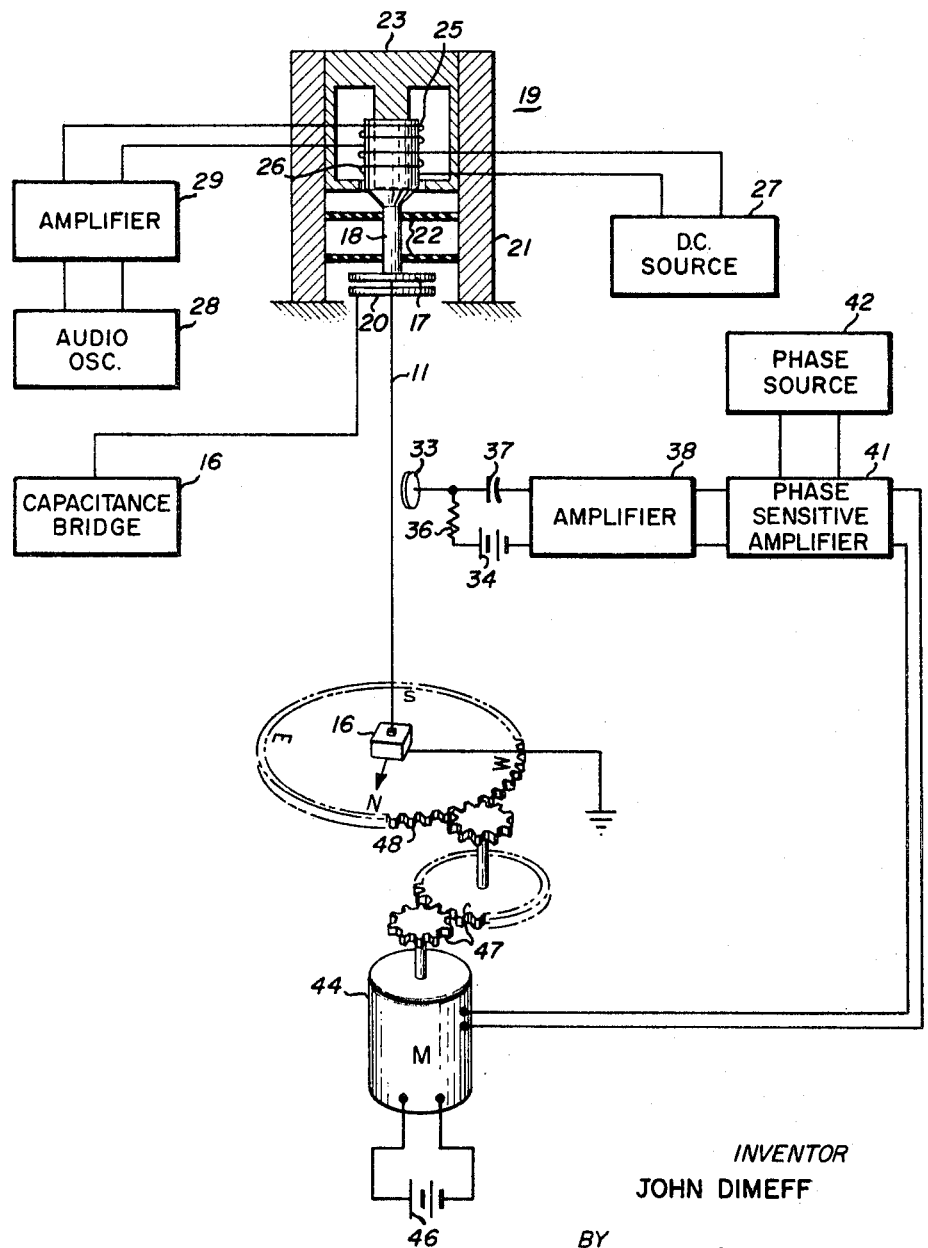

United States Patent Office 3,455,171
Patented July 15, 1969

3,455,171
INERTIAL REFERENCE APPARATUS
John Dimeff, San Jose, Calif., assignor to the United States of America as represented by the Administrator of the National Aeronautics and Space Administration
Filed Mar. 22, 1966, Ser. No. 538,168
Int. Cl. G01p 15/08
U.S. Cl. 73—505                                4 Claims

ABSTRACT OF THE DISCLOSURE

A large-amplitude linear inertial reference of the vibrating string type. The string is end-driven so that the motion of the end of the string is proportional to $\sin^2 \omega t$ where $\omega$ is the natural frequency of the string. This driving function causes constant tension in the string regardless of vibration amplitude.

---

The invention described herein was made by an employee of the United States Government and may be manufactured and used by or for the Government for governmental purposes without the payment of any royalties thereon or therefor.

This invention relates in general to inertial reference devices, and relates more particularly to such references employing a vibrating strand or string.

There has been considerable interest in inertial reference devices for establishing and maintaining a predetermined reference plane in space. Such devices have many applications, such as in navigational devices where they provide a reference against which the direction of motion of the navigated can be measured. Such inertial reference devices have found particular use in areas where conventional navigational systems, such as those relying on the earth's magnetic field, have been unsuitable, as in space or in the polar regions of the earth. Other applications for inertial reference devices include the sensing and measurement of the orientation in space of different bodies.

The prior art inertial reference devices have generally been either of the rotating wheel or sphere (gyro) type, the vibrating rod type or the vibrating string type. Those of the rotating wheel type have the problems associated with bearing frictional which cause drift and large drive power requirements, or else, as in the cryogenic or electrostatically supported gyros, they require complex controls to sense the position of the rotating element. Similarly, the vibrating rod devices, such as a rod supported at one end and free to vibrate at the other end, are sensitive to vibrations of the support which can cause an undesired change in the magnitude and/or orientation of the plane of the rod vibration.

A number of vibrating strand devices have been proposed in which a string (usually wire), which is fixed at both ends, is subjected to a transverse driving force to produce oscillations in a predetermined plane which is fixed in space. This plane may then be used as a reference for measuring linear motion along and perpendicular to the rest axis of the string, and for measuring angular motion about this axis. If small amplitude vibrations are employed in these devices, the string motion may be described by linear equations, but complex measuring apparatus must be employed to detect the motion to be measured. On the other hand, if large amplitude nonlinear vibrations are employed, the device requires a complex drive system in order to preserve stability, and there are then inherent losses in accuracy and reliability as a result of these added complexities.

In accordance with the present invention, a highly stable vibrating string inertial reference device is provided which permits large amplitudes of string deflection with essentially no change in natural frequency with amplitude. This is accomplished by moving one or both ends of the string, along the rest axis, in a manner to offset the increased string tension due to its deflection. In particular, one of the string supports is driven as a predetermined "sine" function of the frequency of vibration of the string to produce the desired string motion.

It is therefore an object of this invention to provide an improved inertial reference device employing a vibrating string.

It is a further object of this invention to provide an improved inertial reference device of the vibrating string type, in which one of the string supports is driven in a predetermined manner.

It is a further object of the present invention to provide an inertial reference device of the vibrating string type in which one of the string supports is driven as a predetermined "sine" function of the frequency of vibration of the string.

It is an additional object of this invention to provide an inertial reference device of the vibrating string type which permits large amplitude vibrations of the string while maintaining stability and without requiring complex string driving elements.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIGURE 1 is a schematic diagram, useful in explaining the theory of operation of the invention, of a string suspended between a fixed and an axially driven support;

FIGURE 2 is an enlarged diagram of a curved portion of the vibrating string of FIGURE 1 which is useful for setting up the equations of motion for the vibrating string; and FIGURE 3 illustrates one embodiment of the inertial reference device of this invention, presented partially in perspective, partially in section, and partially in block diagram form.

To understand the theory of operation of the present invention, consider the string under tension in FIGURES 1 and 2. String 11 has one end secured to a fixed support member A, and has its other end secured to a movable support block B. Assume that the tension T along the string 11 in FIGURE 1 is equal to $T_0 + \Delta T(s,t)$, where $\Delta T(s,t) \ll T_0$, and assume that the string is allowed to vibrate so that it has a constant average tension equal to $T_0$. Since this condition might be achieved by appropriate control of the axial motion of one of the end supports, assume initially that the end support A is taken as the fixed reference for the coordinate system, and that support B may move along the rest or X axis of the string. Additional assumptions which will be made are that: the propagation time along the string is small compared to the period of transverse vibration; the forces introduced by the bending of the string are negligible; the motion of the string is confined to the X–Y plane; and the damping forces are negligible.

The partial differential equations describing the motion of the string are:

$$m\left(\frac{\partial^2 x}{\partial t^2}\right) = \frac{\partial [T(\partial x/\partial s)]}{\partial s} \tag{1}$$

$$m\left(\frac{\partial^2 y}{\partial t^2}\right) = \frac{\partial [T(\partial y/\partial s)]}{\partial s} \tag{2}$$

Considering only the steady-state solution for string motion in the X–Y plane and in the fundamental mode, the well-known solution for Equation 2 is $$y(s,t) = y_0 \sin(\pi s/s_0) \sin \omega_0 t \quad (3)$$

where $\omega_0$ is the low amplitude natural frequency of the string.

One important assumption made in reaching this solution is that the tension remains constant. This assumption implies that the motion of the support block B be controlled so as to hold the instantaneous value of the tension, measured along the string, equal to the tension $T_0$. In determining whether this can be achieved, it will be noted from the geometry of FIGURE 2 that $$(dx)^2 = (ds)^2[1 - (\partial y/\partial s)^2] \quad (4)$$

The partial derivative of $y$ with respect to $s$ can be obtained from Equation 3 and inserted in Equation 4 to provide $$(dx)^2 = (ds)^2[1 - (\pi^2 y_0^2/s_0^2) \sin^2 \omega_0 t \cos^2 (\pi s/s_0)] \quad (5)$$

Taking the square root of both sides of this equation and making the series approximation for the square root of the quantity in brackets, the following approximate expression is obtained $$dx \approx [1 - (\pi^2 y_0^2/2s_0^2) \sin^2 \omega_0 t \cos^2 (\pi s/s_0)]\partial s \quad (6)$$

Integrating this equation produces $$x = s - (\pi^2 y_0^2/4s_0^2)s \sin^2 \omega_0 t - (\pi y_0^2/8s_0) \sin(2\pi s/s_0) \sin^2 \omega_0 t \quad (7)$$

By evaluating Equation 7 at the point $s = s_0$, gives $$x_D = s_0 - (\pi^2 y_0^2/4s_0) \sin^2 \omega_0 t \quad (8)$$

Equation 8 thus describes the motion of the end support B required to maintain a constant tension.

The solution of the partial differential equation in $y$ has produced frequency and shape equations for the motion of the string in the X–Y plane, and has provided the equation of motion for the end support B required to maintain a constant average tension. To determine the validity of the assumption made above that tension is uniform along the string, assume that $x$ accelerations are produced by a combination of two forces; the $x$-directed force resulting from the constant tension component and the curvature of the string, and the addition $x$-directed force required to satisfy the shape and frequency equations derived above. This latter component will result in a time varying tension distribution along the string. If the expression describing this distribution as a function of the deflection, $Y_0$, is derived, and the magnitude of the tension variations are compared with the magnitude of the initial tension, the validity of the assumption that forces introduced by $x$ accelerations are negligible can be judged.

From Equation 1, the forces acting in the $x$ direction can be described as $$m \frac{\partial^2 X}{\partial t^2} ds = \frac{\partial}{\partial s}\left(T \frac{\partial x}{\partial s}\right) ds \quad (9)$$

where $T = T_0 + \Delta T(s,t)$

By solving this equation for T suing the expression for $x$ given by Equation 7, we obtain $$\frac{T}{T_0} = K(t) + \frac{\pi^2 y_0^2}{8 s_0^2}\left(1 + \cos \frac{2\pi s}{s_0} - \cos 2\omega_0 t - \frac{2\pi^2 s^2}{s_0} \cos 2\omega_0 t\right) \quad (10)$$

Since the initial formulation required that the instantaneous value of the tension averaged over the length of the string be constant and equal to $T_0$, we can write $$\frac{1}{s_0} \int_0^{s_0} \frac{T}{T_0} \partial s = 1 \quad (11)$$

By substituting Equation 10 for $T/T_0$, integrating, and solving for the constant of integration, we obtain $$K(t) = 1 + \frac{\pi^2 y_0^2}{8 s_0}\left(\cos 2\omega_0 t + \frac{2\pi^2}{3} \cos 2\omega_0 t - 1\right) \quad (12)$$

and, hence, $$\frac{T}{T_0} = 1 + \frac{\pi^2 y_0^2}{8 s_0^2}\left(\cos \frac{2\pi s}{s_0} + \frac{2\pi^2}{3} \cos 2\omega_0 t - \frac{2\pi^2 s^2}{s_0^2} \cos 2\omega_0 t\right) \quad (13)$$

From this equation we obtain a maximum value for tension variation of $$\left(\frac{\Delta T}{T_0}\right)_{\max} = \frac{\pi^2 y_0^2}{8 s_0^2}\left(1 - \frac{2\pi^2}{3} + 2\pi^2\right) \approx 17.5 \frac{y_0^2}{s_0^2} \text{ at } \omega_0 t = \frac{\pi}{2} \quad (14)$$

Thus, when the average tension of the string is maintained instantaneously equal to $T_0$ and an instantaneous maximum local tension variation of $(\Delta T/T_0)_{\max} = 0.05$ is tolerable, the corresponding range of $y_0$ for which Equation 3 is valid is $y_0/s_0 \leq 0.055$.

The analysis presented above has not required the basic assumption that $ds = dx$, nor the implied assumption that an element of the string must remain in the vertical interval between $x$ and $x + \Delta x$, but it has been limited to $\omega = \omega_0$. A more complete understanding of the string motion requires examination of its motion for $\omega = \omega_0$ and its stability.

Previous analyses of string motion have been made in the $x$–$y$ coordinate system. In order that the results of the present analysis of motion at frequencies other than $\omega_0$ can be more readily compared with other analyses, it is convenient at this point to treat these problems in the more conventional coordinates, making the small amplitude approximations and assuming that ignoring the effect of the moving boundary does not significantly affect the results. The resulting equation for the deflection of the string for the constant tension case is then $$y(x, t) = y_0 \sin \frac{\pi x}{s_0} \sin \omega_0 t \quad (15)$$

If the values of $y_0/s_0$ and $s$ are sufficiently restricted, the displacements of an element of the string obtained from both the $s$ coordinate analysis and the $x$ coordinate analysis are essentially equal. Being cognizant of this comparison for the special case where $\omega = \omega_0$, the motion of a vibrating string driven by an axial end motion, $-x_d \sin^2 \omega t$, can be examined for the case where tension is uniform along the string but is allowed to vary with time, and $\omega$ is allow to assume values other than $\omega_0$.

The motion of a string under initial tension, $T_0$, supported between one stationary end support and a second end support moving with an amplitude $x_{d'} \cos 2\omega t$ has been considered by others. The equation of motion for such a string is $$m \frac{\partial^2 y}{\partial t^2} = \left[T_0 + \frac{E a x_{d'}}{s_0} \cos 2\omega t + \frac{E a}{s_0} \int_0^{s_0} \frac{1}{2}\left(\frac{\partial y}{\partial x}\right)^2 dx\right]\frac{\partial^2 y}{\partial x^2} \quad (16)$$

where $m$ is the mass per unit length, E is Young's modulus, and $a$ is the cross-sectional area of the string. The derivation of this equation required that the amplitude of vibration be sufficiently small that the sine and tangent of the deflection angle can be assumed equal. The terms in brackets in the above equation represent the initial tension, the tension due to driver motion, and the tension due to change in arc length, respectively. For the term involving the arc length, the approximation has been made that $$\sqrt{1 + \left(\frac{\partial y}{\partial x}\right)^2} \approx 1 + \frac{1}{2}\left(\frac{\partial y}{\partial x}\right)^2 \quad (17)$$

The propagation time along the string is assumed to be small compared to the period of transverse vibration, and the forces introduced by the bending of the string are assumed negligible. Only planar motion of the string is considered.

The motion of a string driven by the axial motion of an end support moving with an amplitude $-x_d \sin^2 \omega t$ can be analyzed in the same manner. The equation of motion for this condition is:

$$m\frac{\partial^2 y}{\partial t^2} = \left[T_o - \frac{Eax_d}{s_o}\sin^2 \omega t + \frac{Ea}{s_o}\int_0^{s_o} \frac{1}{2}\left(\frac{\partial y}{\partial x}\right)^2 dx\right]\frac{\partial^2 y}{\partial x^2} \quad (18)$$

The trigonometric identity $\sin^2 \omega t = \frac{1}{2} - \frac{1}{2}\cos 2\omega t$ can be used to write Equation 18 as:

$$m\frac{\partial^2 y}{\partial t^2} = \left[\left(T_o - \frac{Eax_d}{2s_o}\right) + \frac{Eax_d}{2s_o}\cos 2\omega t + \frac{Ea}{s_o}\int_0^{s_o}\frac{1}{2}\left(\frac{\partial y}{\partial x}\right)^2 dx\right]\frac{\partial^2 y}{\partial x^2} \quad (19)$$

This equation is identical in form to Equation 17 and has the same boundary conditions, $y(0,t)=0$, $y(s_o,t)=0$. It can be solved by the technique of separation of variables as outlined below.

If $y(x,t)=F(x)G(t)$, the resulting ordinary differential equation for $F(x)$ is $$\frac{d^2F(x)}{dx^2} + v_n^2 F(x) = 0 \quad (20)$$

The solution to this equation is $$F(x) = A_n \sin v_n x + B_n \cos v_n x \quad (21)$$

In order to satisfy the boundary conditions it is necessary that $B_n=0$ and $v_n=(\pi n/s_o)$ where $n$ is a positive integer. Considering the steady-state solution for the fundamental mode, Equation 21 becomes $$F(x) = A_1 \sin (\pi x/s_o) \quad (22)$$

The time-dependent equation is $$\frac{d^2G(t)}{dt^2} + \left[\omega_o^2\left(1 - \frac{x_d}{2\Delta L_o}\right) + \frac{\omega_o^2 x_d}{2\Delta L_o}\cos 2\omega_o t\right]G(t) + \frac{\pi^2 a_1^2 \omega^2 G^3(t)}{4s_o \Delta L_o} = 0 \quad (23)$$

where $L_o/s_o$ is the initial strain and $$\omega_o = \frac{\pi}{s_o}\sqrt{\frac{T_o}{m}}$$

A particular solution for this equation can be obtained if an approximate solution of the form $$G(t) = K_1 \sin \omega t + K_3 \sin 3\omega t$$

is assumed. When this solution is substituted into Equation 23, the resulting expression consists of terms in $\sin(2n+1)\omega t$; $n=0, 1, 2, \ldots$. If the coefficients of the $\sin \omega t$ and $\sin 3\omega t$ terms are equated to zero, the following relationships are obtained:

$$y_1^2 = K_1^2 a_1^2 = \left[\frac{4s_o x d}{\pi^2} + \frac{16(\omega^2/\omega_o^2 - 1)s_o \Delta L_o}{3\pi^2}\right]$$

$$\frac{y_3}{y_1} = \frac{K_3 a_1}{K_1 a^1} = \left\{\frac{\omega_o^2 - \omega^2}{3[7\omega^2 + \omega_o^2 - \omega_o^2(x_d/\Delta L_o)]}\right\} \quad (24)$$

Thus the steady-state solution to Equation 19 is reasonably well approximated by $$y(x, t) = (y_1 \sin \omega t + y_3 \sin 3\omega t) \sin \frac{\pi x}{s_o} \quad (25)$$

It may be noted that the $3\omega t$ frequency term disappears if $\omega = \omega_o$ regardless of the drive amplitude. This condition also results in the tension being constant at the value $T_o$.

Referring now to FIGURE 3, there is shown one embodiment of the inertial reference device of the present invention utilized in connection with a navigational system. Reference numeral 11 again designates the vibrating string which is mounted between a fixed support member 16 and a controllably movable support member 17. Movable support member 17 is attached to the coil form 18 of an electromagnet 19. Electromagnet 19 includes a rigid frame portion 21 to which coil form 18 is secured through flexure supports 22. Electromagnet 19 also includes a permanent magnet portion 23 and a pair of driving coils 25 and 26 mounted on coil form 18. Coil 26 is supplied with a DC signal from a source 27, while coil 25 is energized from an audio oscillator 28 through an amplifier 29. Oscillator 28 is capable of supplying a current through amplifier 29 to AC coil 25 having the relation 1 cos $2\omega t$.

To calibrate the inertial reference apparatus of FIGURE 3, the position of movable end support 17 is first measured with string 11 at rest. This measurement may be made by any suitable means, such as by positioning a capacitance pickoff 20 adjacent support member 17 and supplying the output therefrom to a capacitance bridge 16, in a well-known manner. The string is then set in motion by supplying a current I proportional to $\cos 2\omega t$ to AC coil 25 from audio oscillator 28. The amplitude A of the corresponding dynamic motion, $A \cos 2\omega t$, may then be measured by capacitance bridge 16.

After this measurement, current is supplied to DC coil 26 from source 27 and its amplitude adjusted so that the rest position of end support 17 is displaced inwardly an amount A. The net inward motion of the end support 17 is then $A - A \cos 2\omega t = X_d \sin^2 \omega t$. With end support 17 thus moving in accordance with the function $X_d \sin^2 \omega t$, the string will be vibrating in the manner discussed in the theory developed above.

To utilize the inertial reference device in a navigational system, a capacitive pickoff plate 33 may be disposed adjacent string 11 to initiate a signal upon any departure from a predetermined angular relationship between the plane of vibration of string 11 and the frame structure including electromagnet 19. Capacitive pickoff 33 may be energized by a voltage source including a battery 34 and a resistor 36, and may be coupled through a capacitor 37 to the input circuit of an amplifier 38. Amplifier 38 supplies its output signal to the input of a phase sensitive amplifier 41 which is also supplied with a phase reference voltage from a source 42.

Amplifier 41 supplies a direct output voltage of a polarity and magnitude which varies with the amplitude of the voltage from amplifier 38 and the phase of this voltage relative to the phase of the voltage from source 42. The output voltage from amplifier 41 is supplied to the input terminals of a reversible motor 44 having a battery 46 connected to the armature terminals thereof. Motor 44 is coupled through a gear train 47 to a large gear element 48 on which string support member 16 rests. Gear 48 is arranged to rotate the entire supporting structure for string 11, including support members 16 and 17 and electromagnet 19.

The assembly, including gear element 48 and electromagnet 19, may be pivotally suspended in the craft to be navigated for rotation about a vertical axis and pickoff 33 is rigid with the craft. In these circumstances, motor 44 is fixed to the craft and is utilized to maintain gear element 48 and the elements associated therewith fixed in space about the vertical axis, by reference to the plane of vibration of string 11.

In operation, while string 11 vibrates in a plane parallel to the face of pickoff 33, no output appears at the terminals of amplifiers 38 and 41, so that motor 44 is inactive. However, if the craft in which the device is installed begins to rotate about the vertical axis, gear element 48 tends to turn from its former orientation, thus rotating pickoff 33 relative to the plane of vibration of string 11. This causes the face of pickoff 33 to become non-parallel with the plane of vibration of the string, so that a voltage is supplied from pickoff 33 to amplifier 38. Amplifier 41 thereupon supplies to motor 44 a voltage of the polarity required to urge gear element 48 in the direction to restore the correct alignment between the face of pickoff 33 and the plane of vibration of string 11. Thus, the apparatus acts to maintain the supporting structure surrounding string 11 in a predetermined alignment with the plane of vibration of string 11, and hence, to hold the directionally calibrated gear element 48 in correct orientation relative to its original calibration.

Experimental work has been performed to substantiate the validity of the theories developed above. In this experimental work, apparatus similar to the inertial reference portion of FIGURE 3 was used, employing a nickel-steel wire of 0.0076 cm. diameter and 40 cm. long. The experimental results showed that the string motion described by the theoretical analysis correlated with its measured motion both in a vacuum and in the presence of air damping. This is of particular importance, since it will be recalled that the effect of air damping was ignored in the derivation of the equations for the motion of the string, and it is of significance that this effect is negligible. Hence, the inertial reference device of this invention is operable either in a vacuum or in the presence of air.

With respect to the stability of the inertial reference devices of this invention, it has been determined theoretically that the oscillations are stable for any amplitude. The theoretical material to support this conclusion is not presented here, in order to avoid unduly lengthening the description, but the conclusion was reached after considering the effect of applying a perturbation to the particular solution and comparing the resulting equation with the Mathieu equation which has a well-established criterion for stability.

While the invention has been particularly shown and described with reference to a preferred embodiment thereof, it will be understood by those skilled in the art that various changes in the form and details may be made therein without departing from the spirit and scope of the invention.

What is claimed is:
1. An inertial reference device of the vibrating string type comprising: a string member, a pair of support members to which opposite ends of said string member are affixed, said pair of support members being mounted for relative motion along the direction of elongation of said string member, driving means associated with said support members to move one of said support members relative to the other of said support members in accordance with a predetermined function to develop a transverse planar vibration of said string member, said predetermined function being proportional to $\sin^2 \omega t$ where $\omega$ is the natural frequency of said string member, and said function causing said string to vibrate with constant tension irrespective of vibration amplitude.

2. An inertial reference device in accordance with claim 1 wherein said driving means comprises an electromagnetic driver, a source of DC voltage and a source of AC voltage, said sources being coupled to said driver, the amplitude of said DC voltage being equal to the peak value of said AC voltage whereby the motion of said driver is proportional to $\sin^2 \omega t$.

3. An inertial reference device in accordance with claim 1 which includes means for detecting rotation of said support members around the axis defined by said string.

4. An inertial reference device in accordance with claim 4 which includes detecting means disposed adjacent said string member and having a surface initially parallel to said plane of vibration of said string member for detecting rotation of said support members about the axis defined by said string.

References Cited
UNITED STATES PATENTS

| | | |
|---|---|---|
| 2,466,018 | 4/1949 | Ferrill. |
| 3,106,847 | 10/1963 | Mullins et al. _____ 73—505 |
| 3,198,019 | 8/1965 | Mullins et al. _____ 73—505 |
| 3,316,768 | 5/1967 | Cook _____ 73—505 |
| 3,349,628 | 10/1967 | Quick _____ 73—505 |
| 3,354,724 | 11/1967 | Kabaian et al. _____ 73—505 |

JAMES J. GILL, Primary Examiner